(12) United States Patent
Koide et al.

(10) Patent No.: US 9,577,765 B2
(45) Date of Patent: Feb. 21, 2017

(54) ARTICLE STORAGE FACILITY AND METHOD OF OPERATING SAME

(71) Applicant: Daifuku Co., Ltd., Osaka-shi (JP)

(72) Inventors: Hiroyuki Koide, Gamo-gun (JP); Yasuhiro Yamazaki, Gamo-gun (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 14/799,939

(22) Filed: Jul. 15, 2015

(65) Prior Publication Data

US 2016/0016732 A1    Jan. 21, 2016

(30) Foreign Application Priority Data

Jul. 17, 2014    (JP) .................................. 2014-146996

(51) Int. Cl.
| | | |
|---|---|---|
| *B65G 1/04* | (2006.01) | |
| *H04B 10/80* | (2013.01) | |
| *B65G 1/06* | (2006.01) | |
| *B65G 1/137* | (2006.01) | |

(52) U.S. Cl.
CPC .............. *H04B 10/80* (2013.01); *B65G 1/0492* (2013.01); *B65G 1/065* (2013.01); *B65G 1/137* (2013.01); *B65G 2203/044* (2013.01)

(58) Field of Classification Search
CPC .............................. H04B 10/80; B65G 1/0492
See application file for complete search history.

(56) References Cited

U.S. PATENT DOCUMENTS

| | | | | |
|---|---|---|---|---|
| 5,002,449 | A * | 3/1991 | Kita ..................... | B65G 1/0492 414/273 |
| 7,880,130 | B2 * | 2/2011 | Sakagami ............. | G01S 7/4814 250/216 |
| 8,687,205 | B2 * | 4/2014 | Onishi .................. | G06F 3/0428 345/173 |
| 2010/0109850 | A1 * | 5/2010 | Kovach .................. | G08C 17/02 340/10.32 |
| 2015/0034804 | A1 * | 2/2015 | Lee ........................ | G01J 1/0411 250/208.2 |
| 2015/0111611 | A1 * | 4/2015 | Mhun ..................... | H04M 1/22 455/556.1 |
| 2015/0365541 | A1 * | 12/2015 | Jiang .................. | H04M 1/72583 455/418 |

FOREIGN PATENT DOCUMENTS

JP          7304508 A    11/1995

* cited by examiner

*Primary Examiner* — Thomas Randazzo
(74) *Attorney, Agent, or Firm* — The Webb Law Firm

(57) ABSTRACT

A main controller controls carry in operations and carry out operations of articles to or from an article storage rack using article transport devices by causing a control command to be transmitted from a first optical communication device that is associated with each article transport device to a second optical communication device provided to each article transport device. The main controller is configured to perform a temporally-divided light-emission control in which a plurality of the first optical communication devices are caused to emit light in a temporally divided manner such that there is only one first optical communication device that emits light in any one time period among the first optical communication devices that are located close to one another in the vertical direction.

6 Claims, 9 Drawing Sheets

Fig.6

| Levels (Carriage Nos.) \ Time periods | T1 | T2 | T3 | T4 | T5 | T6 | T7 | T8 | T9 | T10 | T11 | T12 | T13 | T14 | T15 | T16 | T17 | T18 | T19 | T20 |
|---|---|---|---|---|---|---|---|---|---|---|---|---|---|---|---|---|---|---|---|---|
| 7 |  |  |  |  |  |  | ○ |  |  |  |  |  |  | ○ |  |  |  |  |  |  |
| 6 |  |  |  |  |  | ○ |  |  |  |  |  |  | ○ |  |  |  |  |  |  | ○ |
| 5 |  |  |  |  | ○ |  |  |  |  |  |  | ○ |  |  |  |  |  |  | ○ |  |
| 4 |  |  |  | ○ |  |  |  |  |  |  | ○ |  |  |  |  |  |  | ○ |  |  |
| 3 |  |  | ○ |  |  |  |  |  |  | ○ |  |  |  |  |  |  | ○ |  |  |  |
| 2 |  | ○ |  |  |  |  |  |  | ○ |  |  |  |  |  |  | ○ |  |  |  |  |
| 1 | ○ |  |  |  |  |  |  | ○ |  |  |  |  |  |  | ○ |  |  |  |  |  |

Fig.7

| Levels (Carriage Nos.) \ Time periods | T1 | T2 | T3 | T4 | T5 | T6 | T7 | T8 | T9 | T10 | T11 | T12 | T13 | T14 | T15 | T16 | T17 | T18 | T19 | T20 |
|---|---|---|---|---|---|---|---|---|---|---|---|---|---|---|---|---|---|---|---|---|
| 7 |  |  | ○ |  |  |  | ○ |  |  |  | ○ |  |  |  | ○ |  |  |  | ○ |  |
| 6 |  | ○ |  |  |  | ○ |  |  |  | ○ |  |  |  | ○ |  |  |  | ○ |  |  |
| 5 | ○ |  |  |  | ○ |  |  |  | ○ |  |  |  | ○ |  |  |  | ○ |  |  |  |
| 4 |  |  |  | ○ |  |  |  | ○ |  |  |  | ○ |  |  |  | ○ |  |  |  | ○ |
| 3 |  |  | ○ |  |  |  | ○ |  |  |  | ○ |  |  |  | ○ |  |  |  | ○ |  |
| 2 |  | ○ |  |  |  | ○ |  |  |  | ○ |  |  |  | ○ |  |  |  | ○ |  |  |
| 1 | ○ |  |  |  | ○ |  |  |  | ○ |  |  |  | ○ |  |  |  | ○ |  |  |  |

Fig.8

| Levels (Carriage Nos.) \ Time periods | T1 | T2 | T3 | T4 | T5 | T6 | T7 | T8 | T9 | T10 | T11 | T12 | T13 | T14 | T15 | T16 | T17 | T18 | T19 | T20 |
|---|---|---|---|---|---|---|---|---|---|---|---|---|---|---|---|---|---|---|---|---|
| 7 |  |  | ○ |  |  |  | ○ |  |  |  | ○ |  |  |  | ○ |  |  |  | ○ |  |
| 6 |  | ○ |  |  |  | ○ |  |  |  | ○ |  |  |  | ○ |  |  |  | ○ |  |  |
| 5 | ○ |  |  | (○) | ○ |  |  | (○) | ○ |  |  | (○) | ○ |  |  | (○) | ○ |  |  | (○) |
| 4 |  |  |  | ○ |  |  |  | ○ |  |  |  | ○ |  |  |  | ○ |  |  |  | ○ |
| 3 |  |  | ○ |  |  |  | ○ |  |  |  | ○ |  |  |  | ○ |  |  |  | ○ |  |
| 2 |  | ○ |  |  |  | ○ |  |  |  | ○ |  |  |  | ○ |  |  |  | ○ |  |  |
| 1 | ○ |  |  |  | ○ |  |  |  | ○ |  |  |  | ○ |  |  |  | ○ |  |  |  |

2Gr: carriages 7, 6, 5
1Gr: carriages 4, 3, 2, 1

ARTICLE STORAGE FACILITY AND METHOD OF OPERATING SAME

CROSS-REFERENCE TO RELATED APPLICATION

This application claims priority to Japanese Patent Application No. 2014-146996 filed Jul. 17, 2014, the disclosure of which is hereby incorporated in its entirety by reference.

FIELD OF THE INVENTION

The present invention relates to an article storage facility that performs carry in operations and carry out operations of articles using article transport devices as well as a method of operating such an article storage facility.

BACKGROUND

Article storage facilities, in which articles (which may be article containers for storing or holding articles) can be automatically carried in (i.e., stored) and carried out (i.e., retrieved), are widely in use. Such article storage facilities often have a plurality of levels of article storage shelves, that are spaced apart from one another, each of which can store a plurality of articles in the horizontal direction. As for how the articles are carried into and out of such an article storage facility, there is a method (for example, method that utilizes horizontally moving carriages) in which carrying in and out of articles along the horizontal direction and carrying in and out of articles along the vertical direction are performed separately. And there is also a method (for example, method that utilizes a stacker crane) in which carrying in and out of articles along the horizontal direction and the vertical direction is performed together. In the method that utilizes horizontally moving carriages, for example, carriages, one of which is independently provided for each level and which can move horizontally on the corresponding level, perform the carrying in and out of articles to and from the respective article storage shelves on respective levels. And articles are carried in and out of the article storage facility by causing a lift, which is provided to be used by all levels and which can be moved vertically, to transfer articles that are carried into and out of each level.

JP Publication of Application No. H07-304508 (Patent Document 1) discloses an article storage facility (automatic storage and retrieval device) of the type that utilizes horizontally moving carriages. This article storage facility is configured to be able to perform storage and search/retrieval of articles automatically using carriages called pickers (inner pickers). The picker that is associated with, or provided for, the article storage shelf of each level travels on a track provided along the open side of the corresponding article storage shelf to carry in and out an article to and from the article storage shelf. First optical communication unit is provided in the travel space above the track such that the unit faces the picker whereas the picker is provided with second optical communication unit. Light signal is exchanged between the first optical communication unit and the second optical communication unit. And the picker carries an article into and out of the article storage shelf and transports an article along the track based on the control signal transmitted from the first optical communication unit.

Incidentally, as described above, when there are two or more vertical levels of article storage shelves, light, which is a medium which transmits signals in optical communication, spreads or becomes diffused, making it possible for the light to reach an article storage shelf at a different level from the article storage shelf that is the intended target of the optical communication. For example, when light signals are transmitted from a plurality of first optical communication units in the same period, the light signals may interfere with one another, making it possible for the picker that received the light signals through the second optical communication unit to malfunction or perform a wrong operation. To this end, in Patent Document 1, the first optical communication unit is mounted above the track at one end of the travel space for the picker. The light signal transmitted from the first optical communication unit of a particular level is blocked by the tracks on the level above and below that particular level, making it difficult for the light signal to reach a picker that may exist on the track above or below the particular level. Therefore, even when there are two or more vertical levels of article storage shelves, interference between the light signals can be alleviated, thus reducing the possibility that a picker may malfunction or perform a wrong operation as described above.

The technology of Patent Document 1 is advantageous in that interference between the light signals is alleviated, and the possibility that a picker may malfunction or perform a wrong operation is reduced. However, since the first optical communication units are installed on the tracks, there is a certain constraint placed on the structure of the facility. Therefore, a technology is also desired which is adapted for wider usage and in which interference between the light signals during optical communication is reduced irrespective of the structure of the facility.

SUMMARY OF THE INVENTION

In light of the aforementioned background, technology is desired for reducing interference between the light signals during optical communication, irrespective of the structure of the facility in which articles are carried into and out of article storage shelves by remotely controlling article transport devices using optical communication.

An article storage facility in accordance with the present invention comprises:

an article storage rack including a plurality of levels of support shelves that are spaced apart from one another in a vertical direction, each support shelf being capable of storing a plurality of articles arranged in a row in a horizontal direction; travel paths with a travel path provided for each level of the support shelves and extending in the horizontal direction along a corresponding support shelf; article transport devices with each article transport device configured to travel along a corresponding travel path and to transfer an article to and from a support shelf that is associated with the corresponding travel path; first optical communication devices with a first optical communication device provided in one end area, along a longitudinal direction, of each of the travel paths; second optical communication devices with a second optical communication device provided to each of the article transport devices and configured to perform optical communication with a corresponding first optical communication device; a main controller for controlling carry in operations and carry out operations of articles to or from the article storage rack using the article transport devices by causing the first optical communication devices that are associated with respective article transport devices to transmit control commands; wherein the main controller is configured to perform a temporally-divided light-emission control in which a plurality of the first optical communication devices are caused to emit light in a temporally divided manner such that there is only one first optical communication device that emits light in any one time period among the first optical communication devices that are located close to one another in the vertical direction.

With the arrangement described above, because of the temporally-divided light-emission control performed by the main controller, there would be only one first optical communication device that emits light in any one time period among the plurality of first optical communication devices that are close to one another in the vertical direction; therefore, it becomes easy to reduce interference between the lights transmitted from different first optical communication devices. Therefore, it becomes possible to perform reliable optical communication between each first optical communication device and the corresponding second optical communication device. In addition, the above arrangement does not require any member for physically blocking light; thus, there would be no constraints for the locations for installing the first optical communication devices and the second optical communication devices. Therefore, the above arrangement can be applied irrespective of the structure of the article storage facility. As such, the present arrangement can reduce interference between light signals during optical communication, irrespective of the structure of the facility in which articles are carried into and out of article storage shelves by remotely controlling article transport devices using optical communication.

The technical features of the article storage facility in accordance with the present invention also apply to a method of operating the article storage facility; and such method also falls within the scope of protection of the present invention. The functions and effects of the article storage facility described above may also be achieved by the method of operating the article storage facility. That is, the method of operating an article storage facility in accordance with the present invention is a method of operating an article storage facility including an article storage rack including a plurality of levels of support shelves that are spaced apart from one another in a vertical direction, each support shelf being capable of storing a plurality of articles arranged in a row in a horizontal direction; travel paths with a travel path provided for each level of the support shelves and extending in the horizontal direction along a corresponding support shelf, article transport devices with each article transport device configured to travel along a corresponding travel path and to transfer an article to and from a support shelf that is associated with the corresponding travel path; first optical communication devices with a first optical communication device provided in one end area, along a longitudinal direction, of each of the travel paths; second optical communication devices with a second optical communication device provided to each of the article transport devices and configured to perform optical communication with a corresponding first optical communication device; a main controller for controlling carry in operations and carry out operations of articles to or from the article storage rack using the article transport devices by causing the first optical communication devices that are associated with respective article transport devices to transmit control commands; the method of operating the article transport facility comprising the following step that is performed by the main controller:

a temporally-divided light-emission step in which a plurality of the first optical communication devices are caused to emit light in a temporally divided manner such that there is only one first optical communication device that emits light in any one time period among the first optical communication devices that are located close to one another in the vertical direction.

Examples of preferred embodiments of the present invention are described next. However, the scope of the present invention is not limited to and by the preferable examples of the embodiments described below.

The article storage rack is configured to include a plurality of levels of support shelves. And when the rack includes many such levels, there are cases where there would be no problem even if interference of optical signals during optical communication is not taken into consideration between support shelves that are spaced apart from each other by a sufficient distance in the up-and-down direction (vertical direction). Operating efficiency of the article transport devices would be reduced if the first optical communication devices were controlled such that every one of the first optical communication devices that are provided for the respective support shelves emits light in turn for all of the support shelves that constitute the article storage rack. Therefore, it would be preferable if interference of light is reduced while minimizing reduction in the operating efficiency of the article transport devices. For example, if the plurality of levels of the support shelves are divided into a plurality of groups and if the temporally-divided light-emission control is performed such that there is only one first optical communication device that emits light in each group in any one time period, then the same number of the first optical communication devices as the number of the groups can be allowed to emit light in the same time period in the whole article storage rack. To this end, in one embodiment, the plurality of levels of support shelves provided to the article storage rack in accordance with the present invention are preferably divided into a plurality of groups that are located one above another in the vertical direction. And each of the groups preferably includes a plurality of the support shelves. And the main controller preferably causes the plurality of the first optical communication devices to emit light in a temporally divided manner such that there is only one first optical communication device that emits light in any one time period among the first optical communication devices that are associated with the support shelves that constitute each group. With this arrangement, interference of light can be reduced while minimizing reduction in the operating efficiency of the article transport devices.

Incidentally, since the plurality of groups divided in this way are located one above another in the vertical direction, there would naturally be support shelves that belong to mutually different groups and that are close to one another in the vertical direction. Thus, interference between optical communication signals is more likely to occur, for example, if the first optical communication devices, that are associated with such support shelves that are close to each other, emit light in the same time period. Accordingly, adjustment between different groups is also required even in the case where the temporally-divided light-emission control is performed for each group. In one embodiment, if it is determined that two or more of the first optical communication devices, that belong to mutually different groups and that are in such a positional relationship that optical communication signals would interfere with each other if the two or more of the first optical communication devices are to emit light in a same time period, emit light in the same time period, the main controller of the article storage facility in accordance with the present invention preferably performs an inter-group adjustment control in which mutually exclusive adjustment among the groups is performed such that there is only one first optical communication device that emits light in any one time period among the two or more of the first optical communication devices that are determined to emit light in the same period.

When performing the inter-group adjustment control, it is preferable that a criterion for determining the priority among the groups is defined in advance. The main controller in accordance with the present invention preferably performs the inter-group adjustment control such that priority is given to light emission by the first optical communication device that belongs to a group that includes more support shelves that define the group than any other group. When such a criterion is observed, the article transport devices can operate efficiently in the article storage rack as a whole.

In one embodiment of the method of operating the article storage facility in accordance with the present invention, the plurality of levels of support shelves provided to the article storage rack are preferably divided into a plurality of groups that are located one above another in the vertical direction, wherein each of the groups preferably includes a plurality of the support shelves, and wherein, in the temporally-divided light-emission step, the plurality of the first optical communication devices are preferably caused to emit light in a temporally divided manner such that there is only one first optical communication device that emits light in any one time period among the first optical communication devices that are associated with the support shelves that constitute each group.

In one embodiment of the method of operating the article storage facility in accordance with the present invention, the steps that are performed by the main controller preferably further includes an inter-group adjustment step in which, if it is determined that two or more of the first optical communication devices, that belong to mutually different groups and that are in such a positional relationship that optical communication signals would interfere with each other if the two or more of the first optical communication devices are to emit light in a same time period, emit light in the same time period, mutually exclusive adjustment among the groups is performed such that there is only one first optical communication device that emits light in any one time period among the two or more of the first optical communication devices that are determined to emit light in the same period.

In one embodiment of the method of operating the article storage facility in accordance with the present invention, in the inter-group adjustment step, priority is preferably given to light emission by the first optical communication device that belongs to a group that includes more support shelves that define the group than any other group.

BRIEF DESCRIPTION OF THE DRAWINGS

FIG. 6 is a state transition diagram showing an example of a temporally-divided light-emission control,
FIG. 7 is a state transition diagram showing another example of a temporally-divided light-emission control,
FIG. 8 is a state transition diagram showing an example of a temporally-divided light-emission control for each group.

DETAILED DESCRIPTION

Figure 1:
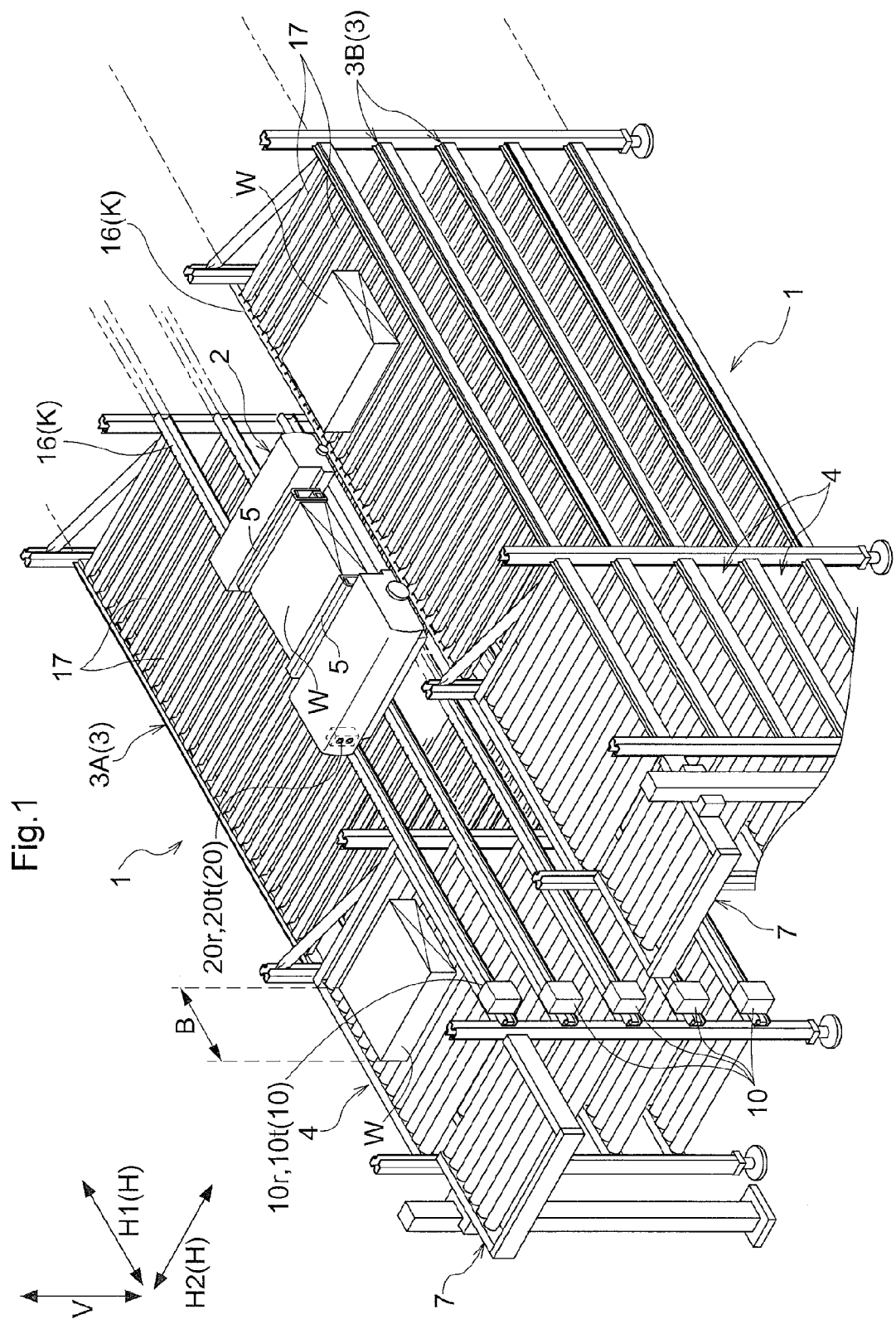
FIG. 1 is a perspective view of an article storage facility.

The embodiments of the present invention are described next with reference to the drawings. In the present embodiment, as shown in FIG. 1, an article storage facility includes article storage racks 1 each of which includes a plurality of levels of support shelves 3 spaced apart from one another in the vertical direction V, with each support shelf capable of storing a plurality of articles W arranged in a row (i.e., with any one article W located next to another) in a horizontal direction (a first horizontal direction H1 which is a horizontal direction and is a direction along which the articles are spaced apart from each other, or a longitudinal direction along which each support shelf 3 extends, as described below). In addition, the article storage facility is provided with travel paths K each of which extends along the longitudinal direction in which the support shelf 3 extends. In other words, the travel paths K extend along the first horizontal direction H1 which is the same direction along which each support shelf 3 extends. In addition, the article storage facility also includes article transport devices (referred to hereinafter as carriages 2) each of which travels on and along the corresponding, or associated, travel path K and each of which transfers an article W to and from the support shelf 3 that is associated with the travel path K. In other words, in the present embodiment, an automated warehouse of the horizontally moving carriage type is illustrated, as an example of an article storage facility, which includes carriages 2 that can move along the first horizontal direction H1.

In the present embodiment, as shown in the perspective view of FIG. 1, articles W, that are rectangular in shape such as rectangular parallelepiped in plan view (i.e., as seen along the direction parallel to the vertical direction V), are stored in the article storage racks 1. Each carriage 2 travels along the direction along which the corresponding support shelf 3 extends (i.e., along the first horizontal direction H1) and on the side of the transfer surface of the corresponding support shelf 3 (i.e., on the side in which an article W is transferred between the support shelf 3 and the carriage 2). In the present embodiment, a travel path K is provided between two support shelves 3 spaced apart along a second horizontal direction H2 which is a horizontal direction H and which is perpendicular to the first horizontal direction H1. The two support shelves 3 (3A and 3B) share the same travel path K and the same carriage 2. In the following description, when the shelf or shelves are referred to simply as "support shelf 3" or "support shelves 3", this may also refer to a pair of support shelves (i.e., a pair 3A and 3B) that are on opposite sides of the travel path K with the travel path K located therebetween.

Figure 2:
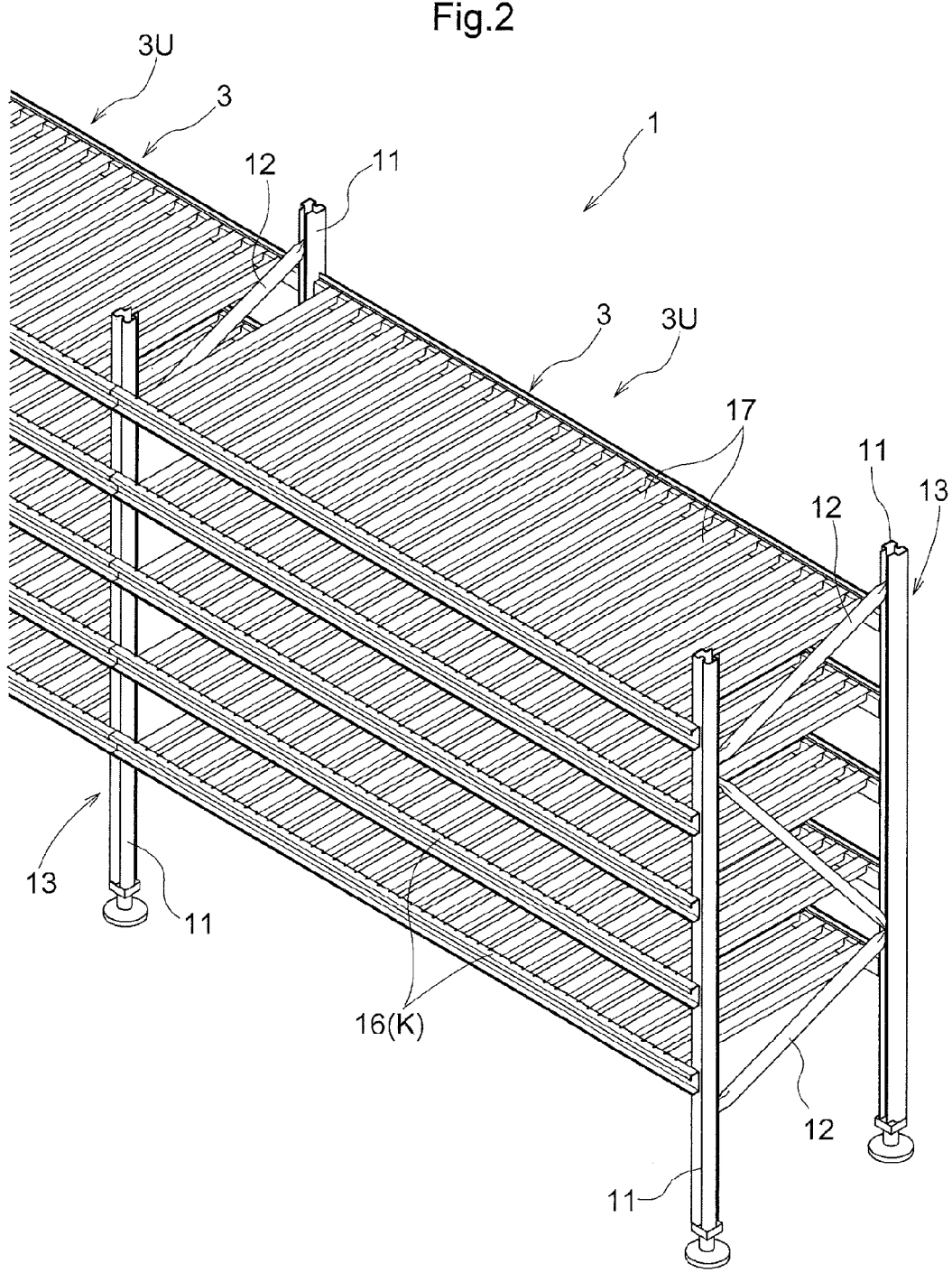
FIG. 2 is a perspective view of storage shelves.

In the present embodiment, each article storage rack 1 includes a plurality of levels (five levels are shown for simplicity) of support shelves 3 that are spaced apart from one another in the up-and-down direction (vertical direction V). In addition, as shown in FIG. 2, each article storage rack 1 is formed by installing the support shelves 3 to span, or extend, between two support column frames 13 provided upright or vertically on the floor. Each support column frame 13 includes two support columns 11 that are provided upright or vertically on the floor and that are paired with each other in the second horizontal direction H2, and beams 12 connected to, and between, this pair of support columns 11 in tilted attitudes so as to form a truss structure. Each support shelf 3 includes a pair of beams 16 that function as horizontal braces that extend along the first horizontal direction H1 and that span, or extend, between the support columns 11 of two support column frames 13 that are adjacent to, and spaced apart from, each other in the first horizontal direction H1, and support frames 17 that function as supports installed to extend along the second horizontal direction H2 and span between the pair of beams 16. This arrangement allows each support shelf 3 to be formed in the shape of a ladder. A plurality of the support column frames 13 are installed such that they are spaced apart from each other along the first horizontal direction H1. A plurality of levels (five levels in the figures) of support shelves 3 are installed to span between a pair of support column frames 13 that are adjacent to, and spaced apart from, each other in the first horizontal direction H1 to define one support shelf unit 3U.

A plurality of such support shelf units 3U are connected together in the first horizontal direction H1, with any one support shelf unit 3U also functioning as a support column frame 13 of another support shelf unit 3U that adjoins it in the first horizontal direction H1, to form, or define, an article storage rack 1 that is longer than the support shelf unit 3U. As such, each article storage rack 1 (the support shelves 3) is long in the first horizontal direction H1. One end of the article storage rack 1 (support shelves 3) along the first horizontal direction H1 will be referred to as a home position HP whereas the other end will be referred to as an opposite position OP. FIG. 1 shows the home position HP side of the article storage racks 1 whereas FIG. 2 shows the opposite position OP side of one of the article storage racks 1. Note that the beam 16 provided on the transfer surface side of each support shelf 3, that is, each of the beams 16 that face or located opposite from each other, functions as the travel path K for the carriage 2 to travel.

As shown in FIG. 1, a relay conveyor 4 is installed on the home position HP side of the support shelf 3 at each level such that the relay conveyor 4 is in series with the corresponding support shelf 3. Each carriage 2 has a transfer device 5 for transferring a target article (the article W to be transferred) between the carriage 2 and an article support position which is the location in which the article W is placed on a support shelf 3 or a relay conveyor 4. The carriage 2 carries in and out articles W, one at a time, between the relay conveyor 4 and the support shelf 3 using the transfer device 5. For example, an article is carried in from the relay conveyor 4 to the support shelf 3 in the following steps. The carriage 2 travels along the travel path K to a position in front of the article support position of the relay conveyor 4, and transfers the article W on the relay conveyor 4 to the carriage 2 using the transfer device 5. The carriage 2 carrying the article W again travels along the travel path K to a position in front of the article support position of the support shelf 3, and transfers the article W from the carriage 2 to the support shelf 3 using the transfer device 5. Since carrying out of an article from the article storage rack 1 is performed in the reverse order, detailed description is omitted here. Note that one carriage 2 is provided for each level such that one carriage 2 corresponds to, or is associated with, the support shelf 3 and the relay conveyor 4 that are provided to each of the plurality of levels in the vertical direction V.

Transfer of an article (transfer within the article storage rack 1) between a support shelf 3 and its relay conveyor 4 is performed using the corresponding carriage 2, as described above. On the other hand, transfer of an article between a relay conveyor 4 and the lift device 7 (transfer between the article storage rack 1 and its exterior) is performed through transporting of the article by means of a roller conveyor provided to each of the relay conveyor 4 and the lift device 7. The article storage facility is provided with the lift devices 7 for transporting articles W to and from a carry-in-and-out conveyor, not shown. An article W that has been carried out from a support shelf 3 to the corresponding relay conveyor 4 through the carriage 2 is transported by the lift device 7 to the carry-in-and-out conveyor. In addition, an article W that has been carried into the article storage facility from the exterior by the carry-in-and-out conveyor is transported by the lift device 7 to the relay conveyor 4 that corresponds to, or is associated with, the support shelf 3 in which the article is to be stored.

Figure 3:
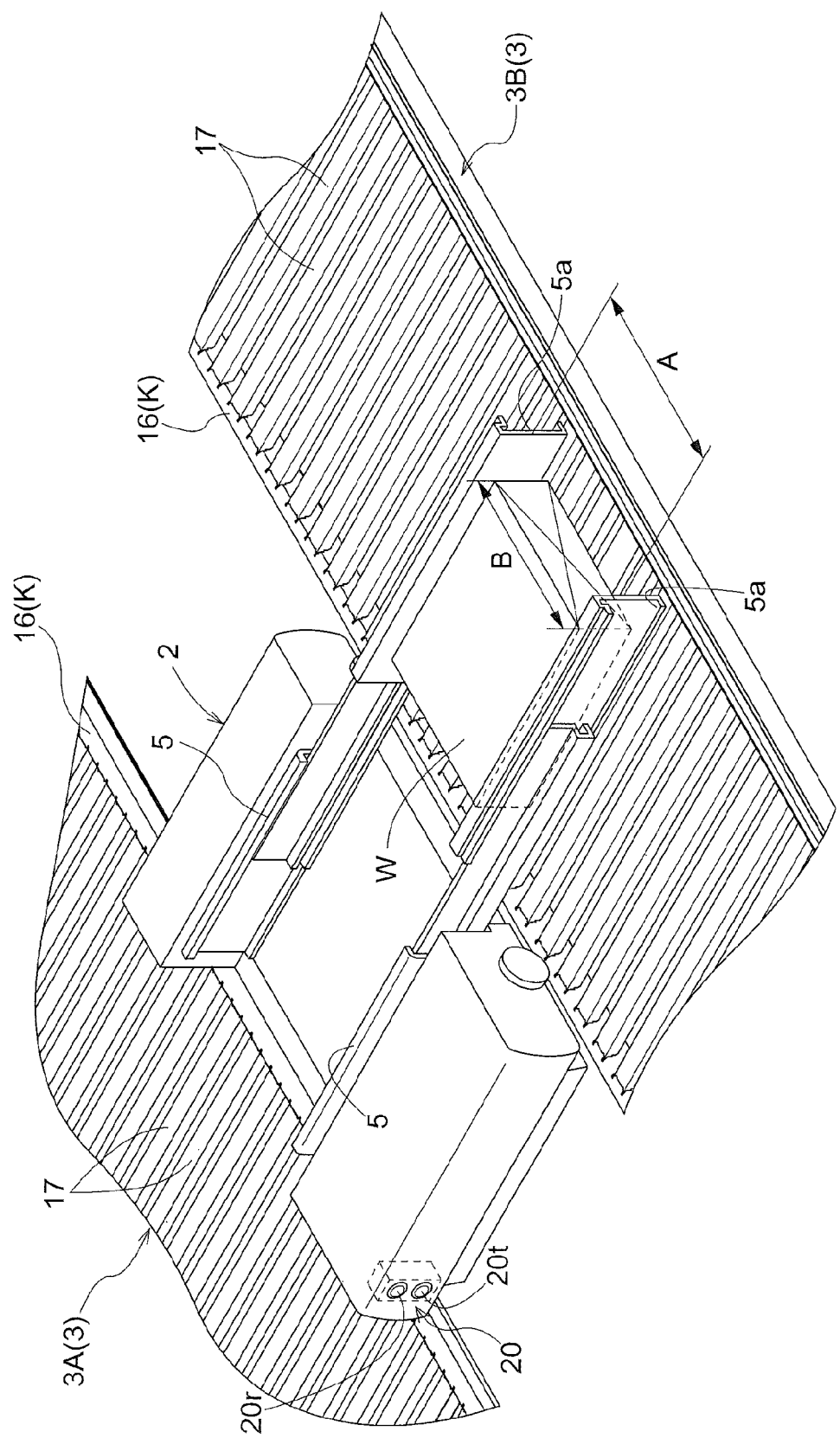
FIG. 3 is a perspective view of a carriage.

As described above, each carriage 2 has a transfer device 5 which holds or grips an article W to transfer an article W to and from the article storage rack 1 (i.e., the support shelf 3 or the relay conveyor 4). As shown in FIG. 3, the transfer device 5 includes a pair of arms 5a which can be projected (projected and retracted) in the direction (the second horizontal direction H2) which is perpendicular to the travel direction of the carriage 2 (the first horizontal direction H1), i.e., the direction toward the article storage rack 1 from the travel path K. In the present embodiment, the arms 5a are configured to be capable of being projected and retracted toward each of the two rows of the article storage racks 1 (support shelves 3) that face each other. The transfer device 5 grips the article W using the pair of arms 5a to transfer the article W. The distance (arm interval A) between the pair of arms 5a can be changed within a predetermined range and is set depending on the article width B (see FIG. 1, dimension of the article in the direction along the travel path K) which is the width of the article W (target article) that is the transfer target (transport target). Preferably, the arm interval A is set to be greater than the article width B of the target article by a set a clearance so that the amount of time it takes to grip the target article can be shortened.

Figure 4:
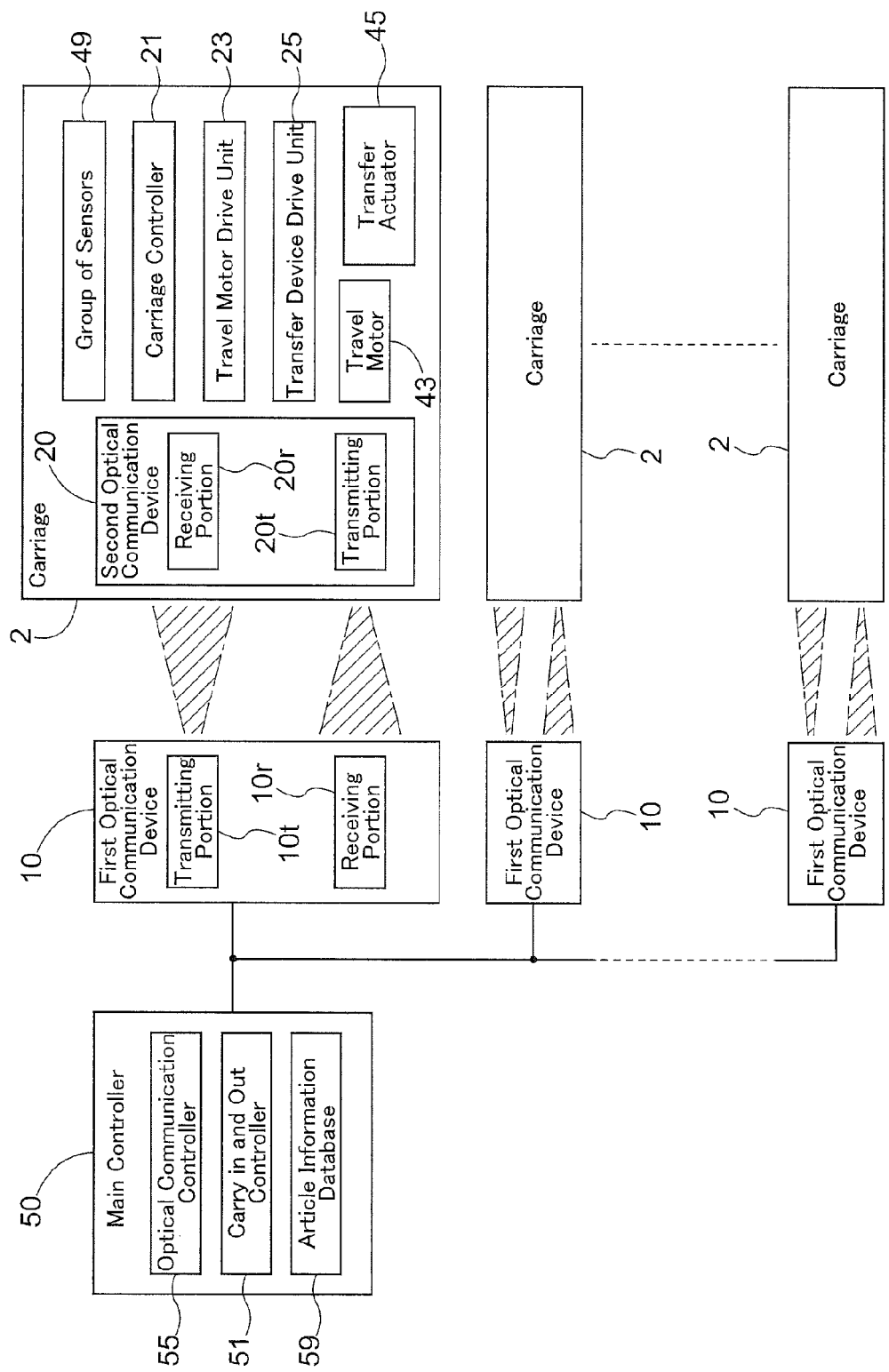
FIG. 4 is a schematic block diagram of the article storage facility,
FIG. 5 schematically shows how interference of light occurs.

As shown in FIG. 4 which is a schematic block diagram of the article transport facility, each carriage 2 has a carriage controller 21, a travel motor drive unit 23, a transfer device drive unit 25, a travel motor 43, and a transfer actuator 45. The carriage controller 21 has, as its core component, a processor such as a microcomputer that includes, for example, a CPU core, program memory (including parameter memory), work memory, a communication controller, an A/D converter, a timer, a counter, ports, etc. The carriage 2 has a group of sensors 49 such as a sensor (presence confirmation sensor) for detecting whether an article W exists on the support shelf 3 or the relay conveyor 4, a sensor (dimension measurement sensor) for measuring the length of the article W in the first horizontal direction H1, a sensor (position sensor) for detecting the position of the carriage 2 along the travel path K using an encoder etc. The carriage controller 21 performs autonomous control of the carriage 2 using the detection results from the group of sensors 49 and possibly other information. Note that the sensors that define the group of sensors 49 are not limited to simple detectors but may include those that can perform calculations to obtain or derive physical quantities. Naturally, the one or more physical quantities may be obtained or derived through collaboration between one or more detectors and the carriage controller 21.

The travel motor drive unit 23 includes a drive circuit such as an inverter that performs drive control of the travel motor 43 which is the source of travel power for the carriage 2. The travel motor 43 is controlled by the carriage controller 21, and is actuated through the travel motor drive unit 23.

The transfer device drive unit 25 has a drive circuit which actuates the transfer device 5 to change the arm interval A and which actuates the transfer actuator 45 for projecting and retracting the arms 5a. The transfer actuator 45 is also controlled by the carriage controller 21, and is actuated through the transfer device drive unit 25.

As shown in the schematic block diagram of FIG. 4, the article storage facility includes a main controller 50, first optical communication devices 10, and carriages 2 each of which has a second optical communication device 20. As described above with reference to FIG. 1 and other drawings, the article storage rack 1 includes a plurality of levels of support shelves 3 that are space apart from one another in the vertical direction V with each support shelf 3 capable of storing a plurality of articles W arranged in a row in a horizontal direction (the first horizontal direction H1). And the travel path K is formed for each support shelf 3 along the first horizontal direction H1. As shown in FIG. 1, a first optical communication device 10 is provided, which functions as a fixed device that is fixed on the travel path K, in one end area, along the longitudinal direction (i.e., on the home position HP side), of each travel path K. That is, the first optical communication device 10 is provided for, or to correspond to, each of the support shelf 3. In addition, as shown in FIGS. 1 and 3, each carriage 2 has a second optical communication device 20 which functions as a movable device. And optical communication is performed between the first optical communication device 10 and the second optical communication device 20 that are provided for each support shelf 3.

The main controller 50 is a controller which has a core role in control operations related to the whole of the article storage facility, or more specifically, to the carry in and out operations of the articles W. The carry in and out operations of the articles W are performed by controlling each carriage 2 and the lift device 7 described above. The main controller 50 transmits control commands, through the first optical communication device, to the corresponding second optical communication device 20 (i.e., to the carriages 2) that is associated with the first optical communication device 10. As described in detail below, the main controller 50 also performs control ("temporally-divided light-emission control" and "inter-group adjustment control" described below) for reconciling, or adjusting, transmissions from various first optical communication devices 10 so that optical communication signals do not interfere with each other.

The main controller 50 includes a carry in and out controller 51, an optical communication controller 55, and an article information database 59. As in the case of the carriage controller 21, the main controller 50 has, as its core component, a processor such as a micro-computer. Each functional component, such as the carry in and out controller 51 and the optical communication controller 55, performs respective functions through collaboration between software such as a computer program and hardware such as a micro-computer. Therefore, software and hardware for one functional component do not need to be completely independent from those for another functional component. And two or more functional components may share and use software and hardware as necessary or as appropriate.

The main controller 50 transmits, through the optical communication controller 55, a carry in and out command (control command) to the first optical communication device 10 for the support shelf 3 (or relay conveyor 4) at the level to which, or from which, the target article W is to be carried in or out. The transmitting portion (10t) of the first optical communication device 10 transmits the control command by emitting light in response to the instruction from the main controller 50. The receiving portion (20r) of the second optical communication device 20 provided to the carriage 2 receives control command by receiving the optical communication signal in the form of light emitted by the transmitting portion (10t) of the first optical communication device 10. And the carriage 2 performs carrying in or out of the article W based on the control command.

When this takes place, the main controller 50 preferably transmits article information on the article W as well so that the carriage 2 can set the arm interval A depending on the article width B of the article W to be transferred. As shown in FIG. 4, the main controller 50 has article information database 59 (article information storage portion) which stores at least the article width B of each article W stored in the article storage racks 1. This article information database 59 stores article information including, in addition to the article widths B, time and date each article W was stored, the kind of each article W, and information on article support position that represents the location of each article W in the article storage racks 1. The carry in and out controller 51 of the main controller 50 generates a control command for controlling a carriage 2 based on this article information, and causes the control command to be transmitted through the first optical communication device 10 to the carriage 2 to be controlled.

Incidentally, the light used for optical communication becomes diffused. For example, when transmitting light from the first optical communication device 10 to the second optical communication device 20, the light emitted by the transmitting portion (10t) of the first optical communication device 10 may also reach the receiving portion (20r) of a second optical communication device 20 that is different from the intended destination for the transmission. This also holds true for transmission of light from the second optical communication device 20 to the first optical communication device 10. Even if an optical communication signal reaches a receiving portion (10r, 20r) that is different from the intended destination for the transmission, the information can be ignored if the information transmitted by the optical communication includes an identifying number for the carriage 2, or a number for identifying the level in the rack, etc. However, when a plurality of transmitting portions (10t, 20t) emit light during the same time period, faulty or otherwise imperfect communication may occur in the receiving portion (10r, 20r) caused by communication interference due to interfering light and/or dilution of communication signals.

Figure 5:
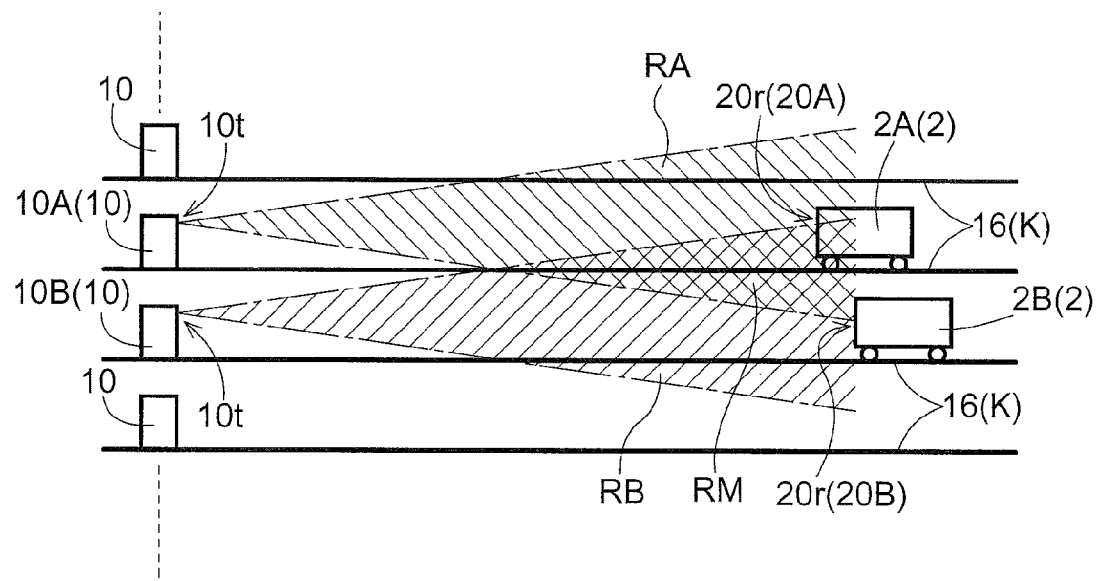

As illustrated in FIG. 5, suppose that the transmitting portions (10t) of a plurality of first optical communication devices 10 (10A, 10B) emitted light during the same time period. (The expression, "during the same time period", means that at least a time period in which information processing in a transmission is performed by one device in question overlaps with a time period in which information processing in a transmission is performed by another device. And the expression does not mean "at exactly the same time". The communication partner or communication target of the first optical communication device 10 indicated by the reference numeral "10A" is the second optical communication device 20 (20A) mounted on the carriage 2 that is indicated by the reference numeral "2A". Similarly, the communication partner or communication target of the first optical communication device 10 indicated by the reference numeral "10B" is the second optical communication device 20 (20B) mounted on the carriage 2 that is indicated by the reference numeral "2B". The irradiation area of light emitted by the transmitting portion (10t) of the first optical communication device 10 indicated by the reference numeral "10A" is the area indicated by the reference symbol "RA" whereas the irradiation area of light emitted by the transmitting portion (10t) of the first optical communication device 10 indicated by the reference numeral "10B" is the area indicated by the reference symbol "RB". In the example shown in FIG. 5, at the receiving portion (20r) of the second optical communication device 20 indicated by the reference numeral "20A" and at the receiving portion (20r) of the second optical communication device 20 indicated by the reference numeral "20B", the irradiation areas of the transmitting portions (10t) of the two first optical communication devices 10 overlap as indicated by the reference numeral "RM". Therefore, the contrast in the digital information shown by, or caused by, ON and OFF states (light on and light off states) of light may decrease, or become diluted, and communication interference and/or deterioration in the accuracy of information may occur.

In the present embodiment, the first optical communication device 10 is the master device (parent or base unit) and the second optical communication device 20 is the slave device (child or extension unit). Accordingly, the second optical communication device 20 does not emit light in order to autonomously transmit an optical communication signal. Instead, the second optical communication device 20 basically emits light in order to respond to the optical communication signal transmitted from the first optical communication device 10. Therefore, interference of optical communication signals, when performing optical communication as described above, can be reduced if arrangements are made so that light emissions by two or more first optical communication devices 10 do not overlap, or occur simultaneously, in the same time period. As described above, transmission (light emission) of the optical communication signal by the first optical communication device 10 is based on the command from the main controller 50. Therefore, the main controller 50 causes the transmitting portions (10t) of a plurality of first optical communication devices 10 to emit light in a temporally divided manner (that is, in mutually different time periods) such that each second optical communication device 20 receives only the optical communication signal from the corresponding, or associated, first optical communication device 10. In other words, the main controller 50 performs a temporally-divided light-emission control in which a plurality of first optical communication devices 10 are caused to emit light in a temporally divided manner (that is, in mutually different time periods) such that there would be only one first optical communication device 10 that emits light in any one time period among the plurality of first optical communication devices 10 that are located close to one another in the vertical direction V. That is, the main controller 50 performs a temporally-divided light-emission step in which a plurality of first optical communication devices 10 are caused to emit light in a temporally divided manner such that there would be only one first optical communication device 10 that emits light in any one time period among the plurality of first optical communication devices 10 located close to one another in the vertical direction V. Here, the "plurality of first optical communication devices 10 located close to one another in the vertical direction V" can mean all of the plurality of first optical communication devices 10 provided to the article storage facility, or a portion of these first optical communication devices 10.

Such temporally-divided light-emission control is described next using a specific example. In this example, the article storage rack 1 is assumed to have seven levels of support shelves 3, with the lowest support shelf 3 defining the first level, and the highest support shelf 3 defining the seventh level. Carriage No. 1 of the carriages 2 is allocated or provided to the travel path K that is associated with the first level of the support shelves 3. Carriage No. 2 is provided to the second level. Similarly, Carriage No. 3, and Carriage No. 4, etc. are provided to the respective levels. And Carriage No. 7 is provided to the highest, or the seventh, level. In FIGS. 6 through 8, the time periods in which optical communication is performed in the temporally-divided light-emission control are indicated by 20 time periods, "T1"-"T20". Each time period "T1"-"T20" is a time period in which optical communication signal is transmitted at least from a first optical communication device 10. Preferably, each time period "T1"-"T20" is a time period in which a handshake communication is completed in which an optical communication signal is transmitted from a first optical communication device 10, and a second optical communication device 20 responds to that signal.

FIG. 6 shows one exemplary embodiment of temporally-divided light-emission control. And in this example, only one first optical communication device 10, among all first optical communication devices 10 at seven levels, transmits an optical communication signal in any one time period. That is, the temporally-divided light-emission control in the example shown in FIG. 6 is a control in which the plurality of first optical communication devices 10 are caused to emit light in a temporally divided manner such that there is only one first optical communication device 10 that emits light in any one time period, among all first optical communication devices 10 provided to the article storage facility. In the example shown in FIG. 6, time periods "T1", "T2", "T3", etc. are allocated to the first level, the second level, and the third level, etc., respectively and in that order. As such, when the temporally-divided light-emission control is performed in this manner, there would be only one transmitting portion (10t) of the first optical communication device 10 that emits light in any one time slot (i.e., in any one time period); therefore, naturally, interference of optical communication signals would not occur. However, this manner of communication cannot be said to be efficient since only 20 carriages 2 in total can be communicated to in the 20 time periods "T1"-"T20".

As can be inferred from FIG. 5, interference of optical communication signals is more likely to occur between support shelves 3 whose physical positions are close to each other. Because of the presence of the support shelves 3, separating distance in the horizontal direction (i.e., the second horizontal direction H2) can be secured to some extent, and light is likely to be blocked by the support shelves 3; thus, this interference is more likely to occur particularly between support shelves 3 whose physical positions are close to each other in the vertical direction V. Therefore, there would be no problem even if interference of optical communication signals is not taken into consideration between support shelves 3 that are spaced apart from each other by a set number of levels which is defined in advance and is determined by, for example, an experiment. For example, there is no need to take into consideration any interference of optical communication signals between the support shelf 3 at the first level and the support shelf 3 at the seventh level because they are spaced apart from each other by a sufficient distance. FIG. 7 shows an example in which the set number of levels is set to "3" so that optical communication is permitted in the same time period without taking interference into consideration for support shelves that are spaced apart from each other by three, or a greater number of, levels. That is, temporally-divided light-emission control in the example shown in FIG. 7 is a control in which a plurality of first optical communication devices 10 are caused to emit light in a temporally divided manner such that there is only one first optical communication device 10 that emits light in any one time period, among the plurality of first optical communication devices 10 located close to one another in the vertical direction V (i.e. a portion (four in the present example) of the first optical communication devices 10 among the plurality of first optical communication devices 10 provided to the article storage facility).

Although the optical communication of all the support shelves 3 is managed and controlled collectively in each of the exemplary embodiments of FIGS. 6 and 7, arrangements may be made such that the support shelves 3 may be divided into a plurality of groups of support shelves 3 located close to one another in the vertical direction V, and such that the temporally-divided light-emission control is performed within each group. In such a case, however, support shelves 3 that belong to different groups may be close to each other in the vertical direction V. When that happens, interference between optical communication signals may occur to at least one of the support shelves 3 belonging to a different group. Therefore, in such a case, a mutually exclusive operation is preferably performed among different groups such that only the transmitting portion (10t, 20t) belonging to one of the groups is permitted to emit light.

FIG. 8 shows one exemplary embodiment in which the support shelves 3 are divided into such groups and in which the temporally-divided light-emission control is performed within each group. The first group (1Gr) consists of four levels (the first or the lowest level through the fourth level) of support shelves 3. The second group (2Gr) consists of three levels (the fifth level through the seventh or the highest level) of support shelves 3. Transmissions from the first optical communication devices 10 that are associated with the support shelves 3 that belong to the first group (1Gr) are controlled by the temporally-divided light-emission control performed within the first optical communication devices 10 that belong to the first group (1Gr). Transmissions from the first optical communication devices 10 that are associated with the support shelves 3 that belong to the second group (2Gr) are controlled by the temporally-divided light-emission control performed within the first optical communication devices 10 that belong to the second group (2Gr). In this example, for the first group (1Gr), the temporally-divided light-emission control is repeated in each round of which the first optical communication device 10 for the support shelf 3 at the first level, the first optical communication device 10 for the support shelf 3 at the second level, the first optical communication device 10 for the support shelf 3 at the third level, and the first optical communication device 10 for the support shelf 3 at the fourth level are caused to emit light in turn and in that order whereas, for the second group (2Gr), the temporally-divided light-emission control is repeated in each round of which the first optical communication device 10 for the support shelf 3 at the fifth level, the first optical communication device 10 for the support shelf 3 at the sixth level, and the first optical communication device 10 for the support shelf 3 at the seventh level are caused to emit light in turn and in that order. In the example shown in FIG. 8, the temporally-divided light-emission control performed for the first group (1Gr) is a control in which the plurality of first optical communication devices 10 are caused to emit light in a temporally-divided manner such that there is only one first optical communication device 10 that emits light in any one time period among the four first optical communication devices 10 that are close to one another in the vertical direction V. And the temporally-divided light-emission control performed for the second group (2Gr) is a control in which the plurality of first optical communication devices 10 are caused to emit light in a temporally-divided manner such that there is only one first optical communication device 10 that emits light in any one time period among the three first optical communication devices 10 that are close to one another in the vertical direction V.

In the example shown in FIG. 8, the number of levels of the support shelves 3 that constitute, or define, the first group is different from the number of the support shelves 3 that constitute, or define, the second group. Therefore, although in the first round of the temporally-divided light-emission control, the support shelves 3 that are associated with the first optical communication devices 10 that transmit optical communication signals in the same time period are spaced apart from each other by a sufficient distance, there are situations in which the support shelves 3 that are associated with the first optical communication devices 10 that transmit optical communication signals in the same time period in the second and subsequent rounds are located close to each other to within the set number of levels (i.e., the number of levels between them is less than the set number of levels). For example, in the time period "T4", the transmitting portion (10t) of the first optical communication device 10 that is associated with the support shelf 3 at the fourth level emits light in the first group (1Gr); and in the second group (2Gr), the transmitting portion (10t) of the first optical communication device 10 to emit light in the same time period would have been the one that is associated with the support shelf 3 at the fifth level (see the circle in broken line) if the ordinary order was to be followed.

Although the support shelf 3 at the fourth level and the support shelf 3 at the fifth level belong to different groups, they are close to each other in the vertical direction V as far as the locations of these support shelves 3 are concerned; and, they are within (or separated by less than) the set number of levels, which is three in the present example. Therefore, interference between the optical communication signals is more likely to occur if the transmitting portions (10t) of the first optical communication devices 10 that are associated with the two support shelves 3 emit light in the same period. To this end, for such a time period (T4), the main controller 50 performs a mutually exclusive adjustment (inter-group adjustment control) so that only one of the transmitting portion (10t) that belongs to the first group and the transmitting portion (10t) that belongs to the second group is permitted to emit light. In other words, an inter-group adjustment step is performed by the main controller 50. This mutually exclusive adjustment is performed based on a priority criterion. When the number of levels that belong to the first group is different from the number of levels that belong to the second group as in the present embodiment, the mutually exclusive adjustment may be performed such that priority is given to the light-emissions by the transmitting portions (10t) that belong to the group having a greater number of levels. That is, the priority criterion in this case is the number of levels of the support shelves 3 that belong to each group. This number of levels is not limited to the number of levels in terms of the physical arrangement of the article storage rack 1, but may be the number of levels of the available or operable shelves which articles W can be carried into or out of at the time. In addition, in another embodiment, the mutually exclusive adjustment may be performed such that priority is given to the light-emissions by the transmitting portions (10t) that belong to the group having a greater number of remaining carrying in and out tasks. The priority criterion in this case is the number of tasks for each group.

Figure 9:
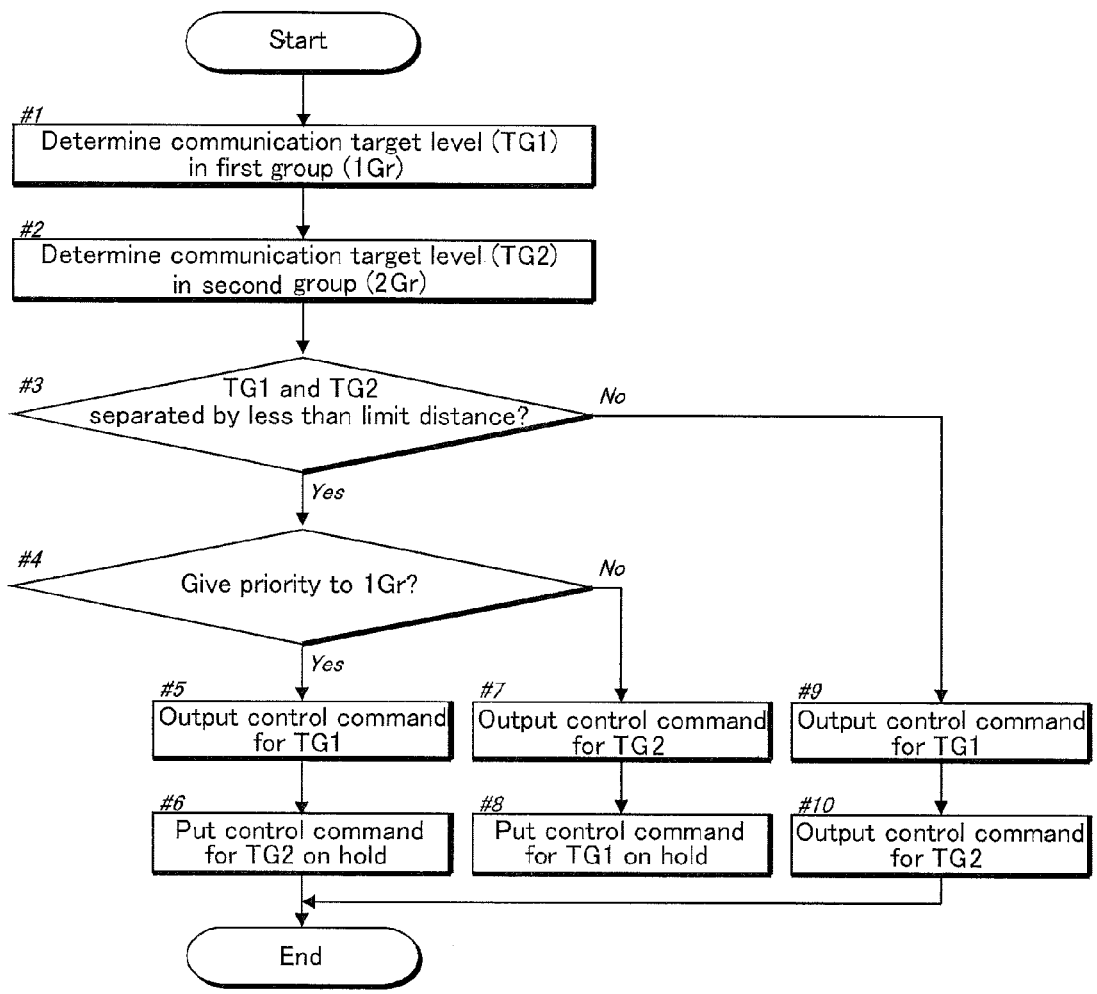
FIG. 9 is a flow chart showing an example of an inter-group adjustment control.

Note that, although FIGS. 6 through 8 show embodiments in which all the levels of support shelves 3 are equally utilized, the invention is naturally not limited to such embodiments. The embodiments may be such that first optical communication device 10 that corresponds to the support shelf 3 that is required to handle carrying in and out operations with high priority may be utilized preferentially, or given priority. In such a case, it is preferably determined, each time optical communication is to be performed, whether the first optical communication device 10 in question is permitted to emit light. The flow chart of FIG. 9 shows an example of the inter-group adjustment control for the case in which the determination is made each time optical communication is to be performed. Here, the example illustrates a situation in which two groups are formed as in the example of FIG. 8.

Firstly, the carry in and out controller 51 determines the level (communication target level TG1, TG2) at which communication is to be performed in each of the first group (1Gr) of support shelves 3 and the second group (2Gr) of support shelves 3 (Steps #1 and #2). And the carry in and out controller 51 generates a control command intended for each of the carriages 2 at the communication target levels (TG1, TG2). Note that the order of Step #1 and Step #2 may be reversed from what is shown in FIG. 9. The optical communication controller 55 determines whether the communication target levels (TG1, TG2) are separated by less than the set number of levels (Step #3). Here, if and when it is determined that the communication target levels (TG1, TG2) are separated by the set number, or greater number, of levels, it is not necessary to perform the inter-group adjustment control. Accordingly, the optical communication controller 55 outputs a control command to each of the first optical communication devices 10 that are associated with the two communication target levels (TG1, TG2) (Steps #9, #10). In this process, the arrangement may be such that a transmitting command (light emission command) is also outputted to the first optical communication device 10 from the optical communication controller 55. Alternatively, the arrangement may be such that the outputting of the control command causes a transmitting command (light emission command) to be given to the first optical communication device 10. Note that the order of Step #9 and Step #10 may also be reversed from what is shown in FIG. 9.

In Step #3, if it is determined that the communication target levels (TG1, TG2) are separated by less than the set number of levels, the optical communication controller 55 performs an inter-group adjustment control (Steps #4-#8). More specifically, outputting of the control command to the communication target level (TG1, TG2) belonging to one of the first group (1Gr) and the second group (2Gr) is caused to wait or to be put on hold, while permitting outputting only of the control command to the other communication target level (TG1, TG2). Which group's communication target level is given priority is determined in accordance with, or based on, the priority criterion (Step #4). As described above, the priority criterion may be among other things, the number of levels of the support shelves 3, the number of levels of available shelves, or the number of tasks, etc.

If, in Step #4, it is determined that the first group (1Gr) is the one to be given priority based on the priority criterion, the optical communication controller 55 outputs a control command to the first optical communication device 10 that is associated with the communication target level (TG1) that belongs to the first group (1Gr) (Step #5). On the other hand, the optical communication controller 55 does not output the control command for the communication target level (TG2) that belongs to the second group (2Gr), to the first optical communication device 10, and puts it on hold. On the contrary, if, in Step #4, it is determined that the second group (2Gr) is the one to be given priority based on the priority criterion, the optical communication controller 55 outputs a control command to the first optical communication device 10 that is associated with the communication target level (TG2) that belongs to the second group (2Gr) (#5). On the other hand, the optical communication controller 55 does not output the control command that is associated with the communication target level (TG1) that belongs to the first group (1Gr), to the first optical communication device 10, and puts it on hold. Note that the order of Step #5 and Step #6 may also be reversed from what is shown in FIG. 9 and that the order of Step #7 and Step #8 may also be reversed from what is shown in FIG. 9.

As described above, the present invention can reduce interference between light signals during optical communication, irrespective of the structure of the facility in which articles are carried into and out of article storage shelves by remotely controlling article transport devices using optical communication.

What is claimed is:
1. An article storage facility comprising:
an article storage rack including a plurality of levels of support shelves that are spaced apart from one another in a vertical direction, each support shelf being capable of storing a plurality of articles arranged in a row in a horizontal direction;
travel paths with a travel path provided for each level of the support shelves and extending in the horizontal direction along a corresponding support shelf;
article transport devices with each article transport device configured to travel along a corresponding travel path and to transfer an article to and from a support shelf that is associated with the corresponding travel path;
first optical communication devices with a first optical communication device provided in one end area, along a longitudinal direction, of each of the travel paths;
second optical communication devices with a second optical communication device provided to each of the article transport devices and configured to perform optical communication with a corresponding first optical communication device;
a main controller for controlling carry in operations and carry out operations of articles to or from the article storage rack using the article transport devices by causing the first optical communication devices that are associated with respective article transport devices to transmit control commands;
wherein the plurality of levels of support shelves provided to the article storage rack are divided into a plurality of groups that are located one above another in the vertical direction,
wherein each of the groups includes a plurality of the support shelves, and
wherein the main controller is configured to perform a temporally-divided light-emission control in which a plurality of the first optical communication devices are caused to emit light in a temporally divided manner such that there is only one first optical communication device that emits light in any one time period among the first optical communication devices that are associated with the support shelves that constitute each group.

2. The article storage facility as defined in claim 1, wherein if it is determined that two or more of the first optical communication devices, that belong to mutually different groups and that are in such a positional relationship that optical communication signals would interfere with each other if the two or more of the first optical communication devices are to emit light in a same time period, emit light in the same time period, the main controller performs an inter-group adjustment control in which mutually exclusive adjustment among the groups is performed such that there is only one first optical communication device that emits light in any one time period among the two or more of the first optical communication devices that are determined to emit light in the same period.

3. The article storage facility as defined in claim 2, wherein the main controller performs the inter-group adjustment control such that priority is given to light emission by the first optical communication device that belongs to a group that includes more support shelves that define the group than any other group.

4. A method of operating an article storage facility, the article transport facility including an article storage rack including a plurality of levels of support shelves that are spaced apart from one another in a vertical direction, each support shelf being capable of storing a plurality of articles arranged in a row in a horizontal direction;

travel paths with a travel path provided for each level of the support shelves and extending in the horizontal direction along a corresponding support shelf;

article transport devices with each article transport device configured to travel along a corresponding travel path and to transfer an article to and from a support shelf that is associated with the corresponding travel path;

first optical communication devices with a first optical communication device provided in one end area, along a longitudinal direction, of each of the travel paths;

second optical communication devices with a second optical communication device provided to each of the article transport devices and configured to perform optical communication with a corresponding first optical communication device;

a main controller for controlling carry in operations and carry out operations of articles to or from the article storage rack using the article transport devices by causing the first optical communication devices that are associated with respective article transport devices to transmit control commands;

wherein the plurality of levels of support shelves provided to the article storage rack are divided into a plurality of groups that are located one above another in the vertical direction, and wherein each of the groups includes a plurality of the support shelves, the method of operating the article transport facility comprising the following step that is performed by the main controller:

a temporally-divided light-emission step in which a plurality of the first optical communication devices are caused to emit light in a temporally divided manner such that there is only one first optical communication device that emits light in any one time period among the first optical communication devices that are associated with the support shelves that constitute each group.

5. The method of operating an article storage facility as defined in claim 4, wherein the steps performed by the main controller further comprising the following step:

an inter-group adjustment step in which, if it is determined that two or more of the first optical communication devices, that belong to mutually different groups and that are in such a positional relationship that optical communication signals would interfere with each other if the two or more of the first optical communication devices are to emit light in a same time period, emit light in the same time period, mutually exclusive adjustment among the groups is performed such that there is only one first optical communication device that emits light in any one time period among the two or more of the first optical communication devices that are determined to emit light in the same period.

6. The method of operating an article storage facility as defined in claim 5, wherein in the inter-group adjustment step, priority is given to light emission by the first optical communication device that belongs to a group that includes more support shelves that define the group than any other group.

* * * * *